C. E. COX.
MIRROR.
APPLICATION FILED FEB. 15, 1915.
1,185,882. Patented June 6, 1916.
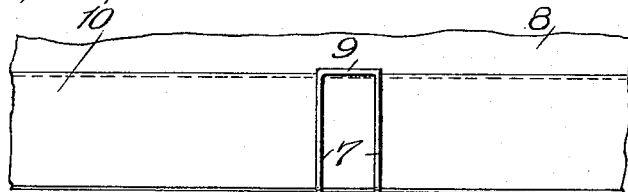
Fig. 1.
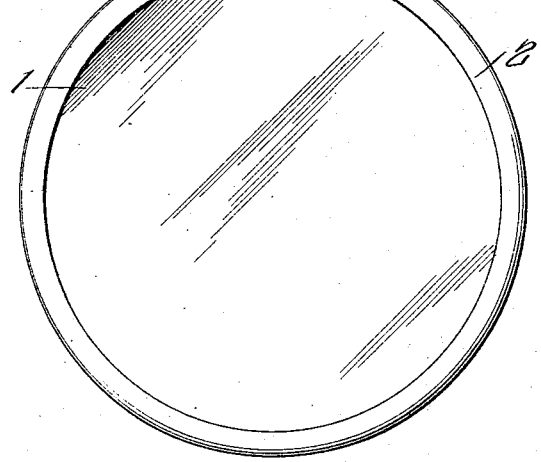
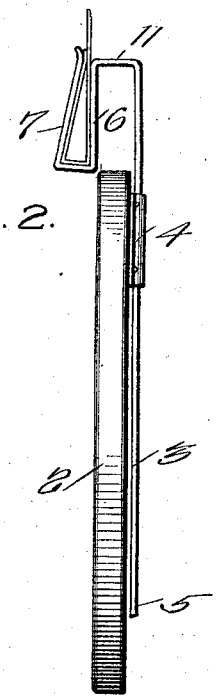
Fig. 2.
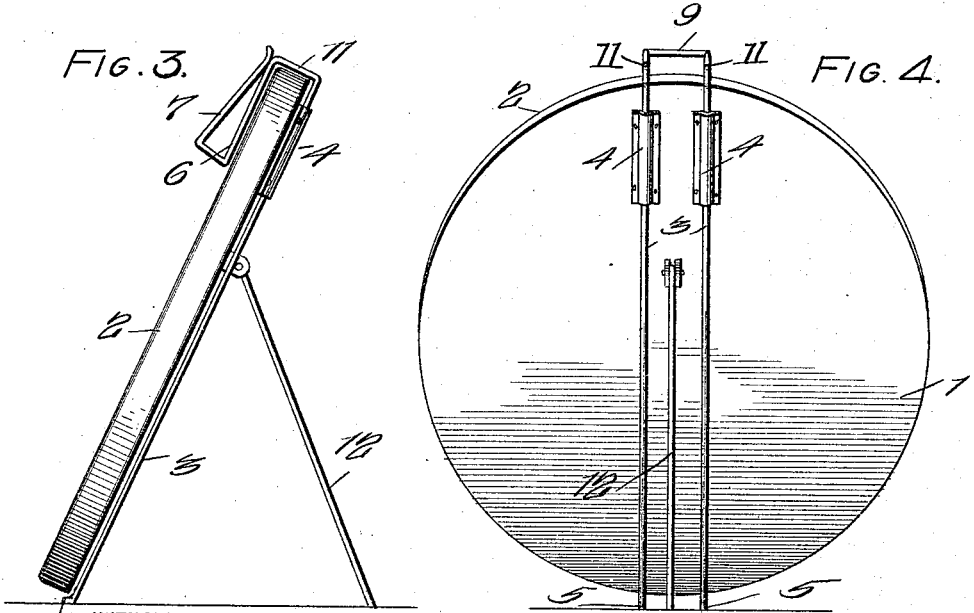
INVENTOR
CHARLES E COX,
BY Munn & Co.
ATTORNEYS
WITNESSES:

UNITED STATES PATENT OFFICE.

CHARLES E. COX, OF PENNINGTON, NEW JERSEY.

MIRROR.

1,185,882.     Specification of Letters Patent.     Patented June 6, 1916.

Application filed February 15, 1915. Serial No. 8,302.

*To all whom it may concern:*

Be it known that I, CHARLES E. Cox, a citizen of the United States, and a resident of Pennington, in the county of Mercer and State of New Jersey, have invented a new and useful Improvement in Mirrors, of which the following is a specification.

My invention is an improvement in mirrors of the portable type and of the class especially adapted for shaving and like purposes of the toilet, wherein a mirror proper or reflector is provided, and a support connected with the mirror in such manner that the mirror may be supported in the manner of an easel on a chiffonnier, dresser, or table, or the mirror may be suspended from a fixed support, and wherein especial means is provided in connection with the support for the mirror for permitting the support to be attached to a window blind or shade.

In the drawings: Figure 1 is a front view of the improved mirror showing the support attached to a window shade, Fig. 2 is an edge view with the parts in inoperative position, Fig. 3 is a similar view showing the mirror supported as an easel, and Fig. 4 is a rear view.

The present embodiment of the invention is shown in connection with a mirror 1 of circular form, having a bound edge 2, and the support to be described, is connected with the rear face of the mirror. The improved support comprises arms 3 of wire or the like, and of suitable cross section, the said arms being arranged parallel and spaced apart from each other and each arm is slidably engaged with a sleeve 4 on the rear face of the mirror.

The arms are parallel as shown, and they are also parallel with a diameter of the mirror, and arranged on opposite sides thereof, and each arm 3 is provided at one end with a stop 5, the stop in the present instance being in the shape of an angular lug formed by bending the extremity of the wire at approximately a right angle to the body of the arm.

It will be noticed from an inspection of the drawing that the sleeves 4 are arranged near the periphery of the mirror, and the stops 5 are intended to engage the inner ends of the sleeves to limit the outward sliding movement of the arms.

The arms are connected at the end remote from the lugs 5, by means of an integral clamp for engaging a support to support the mirror, and the said clamp consists of arms 6 and 7, formed from the material of the arm, by bending a portion of the said material back upon the body of the arm in spaced parallel relation as indicated at 6, and then in the reverse direction as indicated at 7 to form two clamping jaws 6 and 7 spaced apart from each other, and adapted to receive the lower edge of the window shade indicated at 8 between the said jaws to connect the support with the shade.

The portions 7 of the clamp are connected at the end remote from their connection with the arms 6, by means of a cross portion 9, and it will be understood that preferably the arms 3, the clamping jaws 6 and 7, and the cross member 9, are integral, being formed from a single piece of wire bent to form. The clamping members 6 and 7 of each arm engage the shade at the wood strip indicated at 10, which holds the lower end of the shade straight and acts as a weight to hold the shade in proper position. It will be noticed from an inspection of Fig. 1 that the clamping member 6 lies slightly in rear of the adjacent arm 3, and the other clamping member 7 lies slightly in rear of the adjacent member 6.

The clamping members 6 and 7 together with the adjacent portion of the body of the arm form an S shape construction, and since the wires are more or less resilient the clamping members will embrace the wooden strip and the shade sufficiently tight to prevent displacement of the support. The arms 3 engage the sleeves 4 loosely, and the said arms are preferably of a length such that when the support is moved into the position of Fig. 4, that is, with the clamping members 6 at the front of the mirror, and the connection 11 between the said clamping members and the arms 3 contacting with the periphery of the mirror, the lugs 5 will be slightly beyond the opposite edge of the mirror so that when the mirror is used as an easel glass as shown in Fig. 3, the easel support 12, being drawn rearwardly as shown, the ends of the arms 3 will engage the supporting surface upon which the mirror rests to prevent slipping of the edge of the mirror. With the usual form of mirror when it is supported in the manner of an easel there is a tendency of the edge of the mirror to slip, especially if the supporting surface is varnished or polished. With the improved support however, the lugs while they do not mar the supporting surface will yet prevent any slipping of the mirror. While the arms 3 move freely through the sleeves 4 there is sufficient friction to permit the mirror to be adjusted toward and from the shade, when the clamping members 6 and 7 are engaged with the shade to permit some adjustment of the mirror, that is, to vary the height of the mirror. It will be understood that any preferred form of mirror may be used with the support. When the support is in inoperative position the mirror is very compact, and it may be used as a hand mirror. To attach the support to the window shade it is only necessary to push the clamping members 6 and 7 over the lower edge of the shade and a pull in the opposite direction will detach the mirror. The wire support forms an excellent handle for use as a hand mirror.

I claim:—

In combination with a mirror having a hinged easel support, of a support composed of approximately parallel arms, parallel sleeves on the rear face of the mirror for slidable engagement by the arms, and an integral clamping member connecting the arms at one end and offset laterally from the plane of the arms and having an integral connection with the arms adapted to engage the edge of the mirror to limit the sliding movement of the arms in one direction with respect to the mirror, said arms being of a length to extend beyond the opposite edge of the mirror when the integral connection is in engagement with the edge to support the mirror out of contact with the supporting surface when the mirror is supported by the easel support.

CHARLES E. COX.

Witnesses:
JAMES W. RUSLING,
EMILY W. RUSLING.

Copies of this patent may be obtained for five cents each, by addressing the "Commissioner of Patents, Washington, D. C."